US011803433B2

(12) United States Patent
Adamson et al.

(10) Patent No.: US 11,803,433 B2
(45) Date of Patent: *Oct. 31, 2023

(54) LOCALIZATION OF POTENTIAL ISSUES TO OBJECTS

(71) Applicant: Hewlett Packard Enterprise Development LP, Houston, TX (US)

(72) Inventors: David Nellinger Adamson, Oakland, CA (US); Aditya Samalla, San Jose, CA (US); Raymond Mark Cooke, El Granada, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,856

(22) Filed: Sep. 3, 2021

(65) Prior Publication Data

US 2021/0397508 A1 Dec. 23, 2021

Related U.S. Application Data

(63) Continuation of application No. 16/271,384, filed on Feb. 8, 2019, now Pat. No. 11,113,132.

(51) Int. Cl.
*G06F 11/07* (2006.01)
(52) U.S. Cl.
CPC ........ *G06F 11/0751* (2013.01); *G06F 11/079* (2013.01); *G06F 11/0793* (2013.01)
(58) Field of Classification Search
CPC .......................... G06F 11/0751; G06F 11/0793
See application file for complete search history.

(56) References Cited

U.S. PATENT DOCUMENTS

| 7,054,272 | B1 * | 5/2006 | Noel .................. H04L 43/0811 370/465 |
| 7,240,364 | B1 * | 7/2007 | Branscomb .......... H04L 41/085 726/5 |
| 7,280,529 | B1 * | 10/2007 | Black ................. G06F 11/1433 715/741 |
| 7,444,263 | B2 | 10/2008 | White |
| 8,321,247 | B2 | 11/2012 | Trumbly |
| 8,725,741 | B2 | 5/2014 | Cohen |
| 8,881,136 | B2 | 11/2014 | DeJana et al. |

(Continued)

FOREIGN PATENT DOCUMENTS

| CN | 103309703 A | 9/2013 |
| CN | 103428026 A | 12/2013 |

OTHER PUBLICATIONS

Francois Doray, "Diagnosing Performance Variations by Comparing Multi-level Execution Traces," 2016, <https://publications.polymtl.ca/2961/1/2016_Doray_Diagnosing_performance_variations_comparing_multi-level.pdf > (12 pages).

(Continued)

*Primary Examiner* — Jigar P Patel
(74) *Attorney, Agent, or Firm* — Trop, Pruner & Hu, P.C.

(57) ABSTRACT

In some examples, a system identifies a potential issue based on comparing measurement data acquired at different hierarchical levels of a computing environment. Within a hierarchical level of the different hierarchical levels, the system determines, based on measurement data acquired for objects in the hierarchical level, whether the potential issue is localized to a subset of the objects.

18 Claims, 4 Drawing Sheets

(56) References Cited

U.S. PATENT DOCUMENTS

| | | | |
|---|---|---|---|
| 9,251,221 | B1 | 2/2016 | Murphey |
| 9,514,387 | B2 | 12/2016 | Eaton |
| 10,031,815 | B2 | 7/2018 | Cohen |
| 2008/0016412 | A1 | 1/2008 | White et al. |
| 2013/0097463 | A1 | 4/2013 | Marvasti et al. |
| 2014/0172371 | A1 | 6/2014 | Zhu et al. |
| 2014/0214801 | A1* | 7/2014 | Ciliberti, III ......... G06F 16/284 707/738 |
| 2015/0081881 | A1 | 3/2015 | Eaton |
| 2016/0189517 | A1* | 6/2016 | Weast ............... G08B 21/0492 340/573.1 |
| 2016/0378615 | A1 | 12/2016 | Cohen et al. |
| 2017/0017537 | A1 | 1/2017 | Razin et al. |
| 2018/0091413 | A1* | 3/2018 | Richards ............... H04L 43/14 |
| 2018/0357568 | A1* | 12/2018 | Ding ................. G06F 11/2257 |

OTHER PUBLICATIONS

Hewlett Packard Enterprise, Artificial Intelligence for an Autonomous Data Center, Inside HPE Infosight and its recommendation engine, Business white paper, Apr. 2018 (12 pages).

Nada Lavrac et al., Subgroup Discovery with CN2-SD, Journal of Machine Learning Research, Feb. 2004 (36 pages).

VMware, Inc., VMware vCenter Operations Manager Getting Started Guide, 2012, https://www.vmware.com/pdf/vcops-56-getting-started-guide.pdf> (23 pages).

Sole et al., "Survey on Models and Techniques for Root-Cause Analysis", Jul. 3, 2017, arXiv preprint arXiv:1701.08546, 18 pages, <https://arxiv.org/pdf/1701.08546.pdf>.

* cited by examiner

LOCALIZATION OF POTENTIAL ISSUES TO OBJECTS

BACKGROUND

A computing environment includes sensors or monitoring agents to collect information regarding objects within the computing environment. A "computing environment" can refer to any arrangement that includes objects that can perform various tasks, including processing tasks, storage tasks, and/or communication tasks.

BRIEF DESCRIPTION OF THE DRAWINGS

Some implementations of the present disclosure are described with respect to the following figures.

Figure 1:
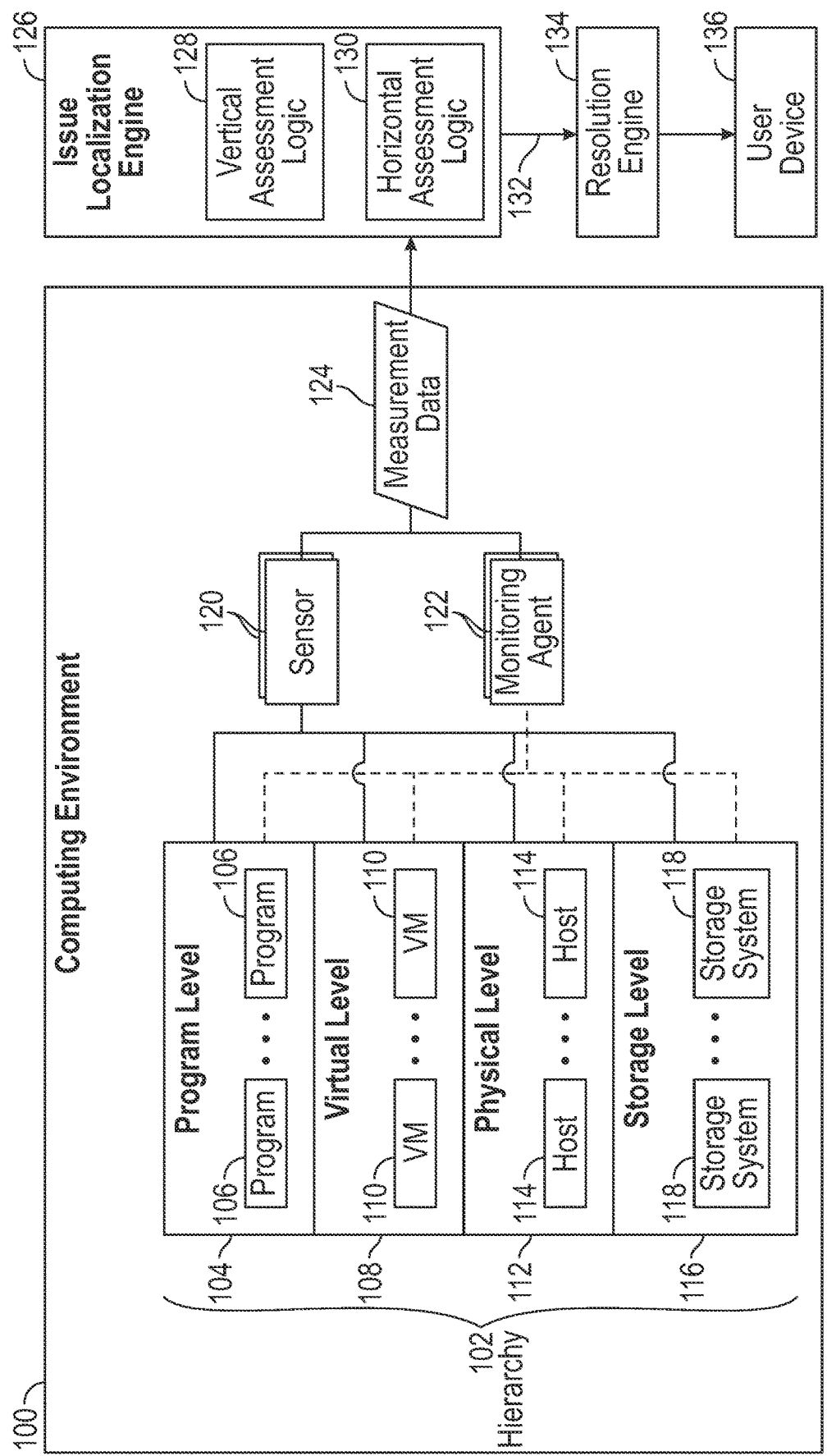
FIG. 1 is a block diagram of a computing environment and an issue localization engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of computing environments include any or some combination of the following: a cloud environment, a data center, a storage network, a communication fabric, and so forth.

A computing environment can include a virtualized environment that includes various objects, including hosts (physical machines), virtual machines (VMS) that can be executed in hosts, storage systems (a storage system can include a single storage device or a storage array comprising a plurality of storage devices), and/or other objects. An "object" can refer to any physical electronic device (e.g., computers, switches, routers, storage systems, etc.) of the computing environment, a virtual device (e.g., a virtual machine, a container, a virtual storage volume, etc.), a program (including machine-readable instructions), and so forth.

To identify issues within the computing environment, information collected by sensors or monitoring agents is analyzed by a system. The identified issues can include faults, failures, errors, and so forth, within the computing environment. Once an issue is identified, the system can generate a recommendation to address the issue. The generated recommendation can specify a remediation action to take to address the issue.

Remediation actions can include remediation actions to be performed by existing components in the computing environment, and/or remediation actions that are to be performed by components that may not yet be deployed in the computing environment. As examples, the recommended actions can include actions pertaining to configurations of a virtualized environment, such as configurations of VMs. As further examples, the recommended actions can include actions pertaining to configurations of hosts and/or storage systems. An action pertaining to a configuration of an object can refer to setting or adjusting a configuration of the object. For example, if the object is a VM, the configuration of the VM can include an amount of a physical resource (e.g., a processing resource, a storage resource, or a communication resource) allocated to the VM. Other example configurations of other types of objects can be set or adjusted.

Additionally, remediation actions can include actions to disable or stop objects within the computing environment, actions to start objects within the computing environment, actions to adjust a speed of operation of objects, and so forth.

A computing environment can include a large number of objects. As a result, there can be a large amount of measurement data collected for the large number of objects, which renders analysis of the measurement data challenging. "Measurement data" can refer to any information collected by a sensor or monitoring agent for an object or a group of objects, or any other part of the computing environment. Challenges associated with analyzing measurement data can include recognizing patterns (to identify issues) and localizing potential issues to specific objects of the computing environment. As used here, localization of an issue to an object can refer to making an assessment that the issue is caused by the object (either individually or as part of a collection of objects).

Examples of measurement data that can be collected from a computing environment can include latency metrics that can be reported by sensors or monitoring agents for VMs, hosts (i.e., physical machines), storage systems, programs, and any other objects. A latency metric provides an indication of latency associated with an object, such as a time duration to perform a given task (e.g., a processing task, a storage task, and/or a communication task). In other examples, measurement data can include performance metrics that represent levels of performance of respective objects, such as a number of operations performed by an object in a unit time, a number of input/output (I/O) operations performed by an object in a unit time, a depth of a queue for buffering data during operation of an object, and so forth. Other types of metrics can be included as part of measurement data collected for a computing environment in other examples.

FIG. 1 is a block diagram of a computing environment 100 that includes various objects at different hierarchical levels of a hierarchy 102, according to some examples. The hierarchy 102 includes the following hierarchical levels: a program level 104 that includes programs 106, a virtual level 108 that includes VMs 110 (and/or other virtual resources such as containers, virtual storage volumes, etc.), a physical level 112 that includes hosts 114 (and/or other physical resources such as processors, network interface controllers, graphics controllers, memory controllers, etc.), and a storage level 116 that includes storage systems 118 (and/or other storage resources, such as memories, caches, etc.).

Although specific example hierarchical levels are shown in FIG. 1, different hierarchical levels can be provided in other hierarchies.

Note that although FIG. 1 shows the different hierarchical levels 104, 108, 112, and 116 as being at distinct levels, it is noted that a hierarchical level may be contained or otherwise overlap another hierarchical level. Thus, for example, the VMs of the virtual level 108 may be executed within the hosts of the physical level 112. As another example, VMs of the virtual level 108 may have disks of storage systems of the storage level 116.

A program 106 can refer to any or some combination of the following: a boot program, an operating system, an application program, a utility program, and so forth. A storage system 118 can include a storage device or multiple storage devices. The storage device can be implemented using a disk-based storage device, a solid state storage device, a memory device, and so forth. A host 124 can be in the form of a physical machine, such as a computer, a collection of computers, a portion of a computer, and so forth.

The computing environment 100 further includes sensors 120 and/or monitoring agents 122 to measure data relating to operation of various objects in the various hierarchical levels of the hierarchy 102. The computing environment 100 can also include monitoring agents 122. A sensor 120 can refer to a hardware sensor that can physically measure a metric. A monitoring agent 122 can refer to machine-readable instructions that can monitor operation of a respective object, and derive a metric based on the monitored operation.

The sensors 120 and/or monitoring agents 122 can provide measurement data 124 to an issue localization engine 126. The measurement data 124 can include various metrics, including a latency metric, a performance metric, and so forth.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The various objects of the computing environment, including the programs 106, the VMs 110, the hosts 124, and the storage systems 118 can have relationships with respect to one another. For example, a VM 110 (or multiple VMs 110) can be executed in a host 114. A program 106 (or multiple programs 106) can be executed in a VM 110 or in a host 114. A storage system 118 can be part of a host 114, or can be accessible by a host 114 (or multiple hosts 114) or a VM 110 (or multiple VMs). Other relationships among objects in the different hierarchical levels of the hierarchy 102 are also possible. More generally, a relationship between objects can include a containment relationship (in which a first object is contained within a second object), a link relationship (in which a first object is physically or logically linked to a second object), or any other type of relationship.

The issue localization engine 126 includes a vertical assessment logic 128 and a horizontal assessment logic 130. The vertical assessment logic 128 and the horizontal assessment logic 130 can be implemented as portions of the hardware processing circuit of the issue localization engine 126, or can be implemented as machine-readable instructions executable by the issue localization engine 126.

The vertical assessment logic 128 is used to assess measurement data acquired for objects in the different hierarchical levels of the hierarchy 102. The assessment performed by the vertical assessment logic 128 can include a determination, based on the measurement data acquired for the objects at the different hierarchical levels, a potential issue of the computing environment 100. The vertical assessment logic 128 can compare the respective measurement data acquired for the different hierarchical levels of the hierarchy 102 (e.g., by comparing measurement data acquired for the program level 104, measurement data acquired for the virtual level 108, measurement data acquired for the physical level 112, and measurement data acquired for the storage level 116).

As a more specific example, the measurement data can include values of latency metrics associated with the different hierarchal levels. For example, there can be a latency metric for the storage level 116 (referred to as a "storage latency" for example), a latency metric for the physical level 112 (referred to as a "host latency" for example, a latency metric for the virtual level 108 (referred to as a "VM latency" for example), a latency metric for the program level 104 (referred to as a "program latency" for example), or any other type of latency metric (e.g., a network latency metric, a total latency metric that is an aggregate of multiple latency metrics, etc.).

The latency metric for a corresponding hierarchical level can express the latency experienced by objects of the hierarchical level. Thus, the vertical assessment logic 128 can determine that the physical level and the storage level are experiencing latencies that are comparable to one another (i.e., the latency experienced by the physical level is within a specified range of the latency experienced by the storage level), whereas the virtual level 108 and the program level 104 may be experiencing a low amount of latency. Based on this determination, the vertical assessment logic 128 can conclude that a latency issue may be associated with a communication network between the hosts 124 of the physical level 112 and the storage systems 118 of the storage level 116. The potential issue in this example is a network delay issue.

In some cases, values of metric values reported for a first hierarchical level may not reconcile with metric values reported for a second hierarchical level. This may be caused by inconsistencies in reported metric measurements from the sensors 120 and/or monitoring agents 122. For example, the sensors 120 and/or monitoring agents 122 may be experiencing faults or errors that may prevent the sensors 120 and/or monitoring agents 122 from properly reporting measurement data. Alternatively, noise in the computing environment 100 can cause sensors 120 and/or monitoring agents 122 to report unreliable measurement data. The noise can be due to malfunctioning objects in the computing environment 100, for example.

Inaccurate measurement data may incorrectly indicate that the latency experienced by the virtual level 108 and the latency experienced by the physical level 112 are relatively close to each other, when in fact the virtual level 108 is not experiencing any significant latency that is indicative of a potential issue with the virtual level.

Inaccurate measurement data from the sensors 120 and/or monitoring agents 122 can make diagnostics of potential issues difficult or inaccurate.

In accordance with some implementations of the present disclosure, the horizontal measurement logic 130 is able to increase the confidence in attribution of metrics to different objects of the different hierarchical levels of the hierarchy 102. For example, if the vertical assessment logic 128 makes a determination that objects of a particular hierarchical level is the cause of a potential issue, the horizontal assessment logic 130 can perform an assessment of whether the potential issue can be localized to a subset of the objects within the particular hierarchical level. A subset of objects can include a single object or multiple objects (e.g., less than all of the objects in the particular hierarchical level). Localization of a potential issue to a subset of objects can refer to making an assessment that the potential issue is caused by the subset of objects.

In some examples, the assessment of whether a potential issue is localized to a particular subset of objects includes an assessment based on measurement data collected for the same or similar type of objects within the hierarchical level. For example, if a given hierarchical level includes several different types of objects, then the assessment performed by the horizontal assessment logic 130 is based on measurement data for objects of the same or similar type within the given hierarchical level. For example, the virtual level 108 can include the following different types of virtual resources: VMs (a first type of virtual resources), virtual storage volumes (a second type of virtual resources), and so forth. The localization of a potential issue to a subset of objects in the virtual level 108 can be based on measurement data collected for the first type of objects (e.g., VMs) and/or for the second type of objects (e.g., virtual storage volumes).

The assessment performed by the horizontal assessment logic 130 can also be referred to as horizontal comparison that attempts to localize a potential issue to a particular subset of objects, such as hosts, storage systems, data stores, VMs, programs, and so forth. The horizontal comparison by the horizontal assessment logic 130 is used to verify the "signal" provided by the vertical assessment logic 128, where the "signal" can refer to an assessment result output by the vertical assessment logic 128. The assessment result from the vertical assessment logic 128 can include an indication that a particular hierarchical level (or multiple hierarchical levels) is (are) the potential cause of a potential issue.

As an example, if the horizontal assessment logic 130 determines that a potential latency issue is localized to a particular host(s) 124 of the physical level 112, then that would provide a greater confidence in the assessment that the hosts 124 of the physical level 112 are causing the latency issue, as compared to another scenario where the horizontal assessment logic 130 is unable to localize the latency issue to any subset of the hosts 124.

The horizontal comparison is performed based on use of a technique that computes localization scores for respective objects within a hierarchical level. In some examples, Eq. 1 can be used to compute a localization score Lscore for a given object within a hierarchical level.

$$\text{Lscore} = p(\text{ScopeMetric})^n \cdot (p(\text{ProblemMetric}|\text{ScopeMetric}) - p(\text{ProblemMetric})). \quad \text{(Eq. 1)}$$

Eq. 1 outputs the localization scores Lscore that are based on metric values collected for objects of a hierarchical level. The localization score provides an indication of the significance of an identified potential issue to a specific subset of objects in the hierarchical level. If the localization score Lscore satisfies a criterion (e.g., the localization score Lscore exceeds a specified threshold), then that provides an indication that there is sufficient localization of the potential issue to a specific subset of objects in the hierarchical level.

In Eq. 1, the value of n is greater than 0 and less than 1. Also, a function p( ) represents a probability. The parameter ScopeMetric represents a condition that is to be satisfied by a metric value to be indicative of a potential issue (e.g., ScopeMetric is a threshold). The parameter ProblemMetric represents a metric value that is problematic. The probability p(ScopeMetric) represents a probability that metric values of objects in the overall computing environment 100 (or portion of the computing environment 100) will satisfy the condition. The probability p(ProblemMetric) represents a probability of problematic metric values. The probability p(ProblemMetric ScopeMetric) represents a probability of problematic metric values given metric values of objects in the overall computing environment 100 (or portion) will satisfy the condition. As an example, if p(ProblemMetric) is low overall for VMs in a computing environment (or portion), but p(ProblemMetric ScopeMetric)) (which can represent, in this example, a probability that a VM is in a problem state given that the VM is on a specific host) is high, the following would be indicated: being on the specific host is predictive of a VM having the potential issue and thus the host is worthy of further investigation (to determine causation or correlation).

More generally, the determination of localization is based on the relative values of p(ProblemMetric) versus p(ProblemMetric|ScopeMetric). The larger the difference between these values the more important the condition (represented by ScopeMetric) is to determining the degree of the potential issue.

Eq. 1 produces a localization score that is based on a tradeoff between rule generality (or the relative size of a subgroup p(ScopeMetric)) and distributional unusualness or relative accuracy (the difference between rule accuracy p(ProblemMetric|ScopeMetric) and default accuracy p(ScopeMetric)).

The localization score is based on metric data collected from an environment, and provides an indication of a significance of an identified potential issue to a specific subset of objects.

Note that multiple objects (or multiple subsets of objects) within a hierarchical level can have respective localization scores Lscore that each satisfies the criterion (e.g., the localization scores Lscore of the multiple subsets of objects each exceeds the specified threshold). In such cases, the localization scores Lscore for the multiple subsets of objects can be used to rank the multiple subsets of objects. For example, a subset of objects with a higher localization score Lscore can be ranked higher than another subset of objects with a lower localization score Lscore.

The issue localization engine 126 produces an assessment result 132 that is output to a resolution engine 134. In examples where the issue localization engine 126 determines that the potential issue is localized to one subset of objects, then the assessment result 132 can include information identifying the subset of objects. In examples where the issue localization engine 126 determines that the potential issue is localized to multiple subsets of objects, the assessment result 132 can include ranking information that ranks the multiple subsets of objects, where the ranking is based on the localization scores, for example.

The resolution engine 134 can respond to the assessment result 132 by triggering an automated remediation action to address the potential issue. Examples of remediation actions are provided further above.

In other examples, the resolution engine 132 can also provide information to a user device 136 (such as a user device associated with an administrator). The user device 136 can include a desktop computer, a notebook computer, a tablet computer, a smartphone, and so forth. The information provided to the user device 136 can identify the potential issue, and object(s) within a hierarchical level (or multiple hierarchical levels) to which the potential issue has been localized by the issue localization engine 126. The information can be presented in a user interface of the user device 136, to allow the user to perform an action in response to the potential issue.

Figure 2:
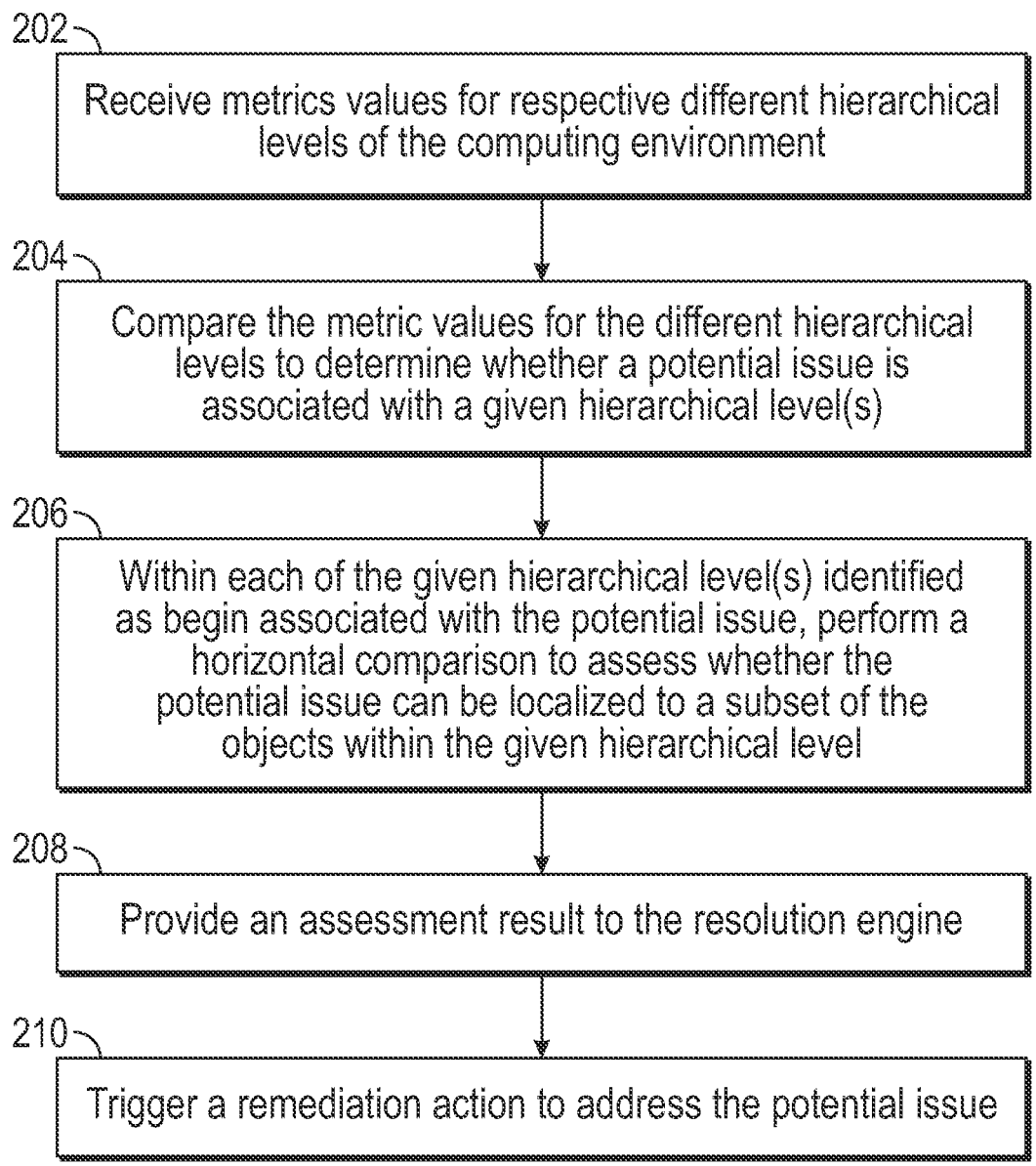
FIG. 2 is a flow diagram of a process according to some examples.

FIG. 2 is a flow diagram of a process that can be performed by various entities shown in FIG. 1, for example. The issue localization engine 126 receives (at 202) metric values for respective different hierarchical levels of the computing environment 100. The measurement data is provided by the sensors 120 and/or monitoring agents 122.

The vertical assessment logic 128 compares (at 204) the metric values for the different hierarchical levels. For example, the vertical assessment logic 128 compares metric values for the program level 104 to the metric values for the virtual level 108, compares metric values for the virtual level 108 with the metric values for the physical level 112, compares metric values for the physical level 112 with the metric values for the storage level 116, and so forth. Based on the comparisons, the vertical assessment logic 128 can determine whether a potential issue is associated with a given hierarchical level (or multiple given hierarchical levels).

Within each of the given hierarchical level(s) identified by the vertical assessment logic 128 as being associated with the potential issue, the horizontal assessment logic 130 performs (at 206) a horizontal comparison to assess whether the potential issue can be localized to a subset of the objects within the given hierarchical level. As discussed further above, the horizontal assessment logic 130 computes localization scores (e.g., according to Eq. 1) for respective subsets of objects within the given hierarchical level. The horizontal comparison performed by the horizontal assessment logic 130 can include comparing a localization score of a subset of objects to a specified threshold. As an example, if the localization score exceeds the specified threshold, then the potential issue is localized to the corresponding subset of objects.

It is possible that the localization scores for multiple subsets of objects exceed the threshold, in which case the potential issue is localized to multiple objects.

The significance of a potential issue is based on localization between types of metric values and respected types of objects of a hierarchical level. For example, if a host-related metric localizes to a host-related object, then that would indicate that the corresponding issue would be more significant. This can be based on application of a specified rule (or multiple rules). More generally, determining that the potential issue is localized to a subset of the objects includes determining that a type of measurement data for the subset of the objects matches an object type of an object in the subset of the objects. The type of measurement data is considered to "match" an object type based on pre-definition by an administrator, a program, or a machine, for example.

After the horizontal comparison performed by the horizontal assessment logic 130, the issue localization engine 126 provides (at 208) the assessment result 132 to the resolution engine 134. The assessment result 132 can identify one subset of objects as being localized to the potential issue, or can identify multiple subsets of objects as being localized to the potential issue. In the latter case, the assessment result 132 can include a ranking of the multiple subsets of objects, such as based on the localization scores of the multiple subsets of objects.

The resolution engine 134 triggers (at 210) a remediation action to address the potential issue. If the assessment result 132 includes information localizing the potential issue to a subset (or multiple subsets) of objects, then that provides an indication to the resolution engine 134 that the assessment made by the vertical assessment logic 128 that the potential issue is associated with a given hierarchical level is accurate with a high confidence. In such a scenario, the resolution engine 134 can trigger a remediation action to be taken.

Also, in response to determining that the potential issue is localized to the subset of the objects, the remediation engine 134 can identify a subset of the objects as being a cause of the potential issue. In cases where there are multiple subsets of objects to which the potential issue is localized, then the ranking of the multiple subsets of objects can be used by the remediation engine 134 to identify the subset of the objects that is highest ranked as being the cause of the potential issue.

If the assessment result 132 does not indicate that the potential issue is localized to any subset of objects, then the remediation engine 134 indicates that a cause of the potential issue is not specific to any subset of the objects. Also, this may be an indication that the assessment by the vertical assessment logic 128 of the potential issue as being associated with a given hierarchical level has a low confidence.

Figure 3:
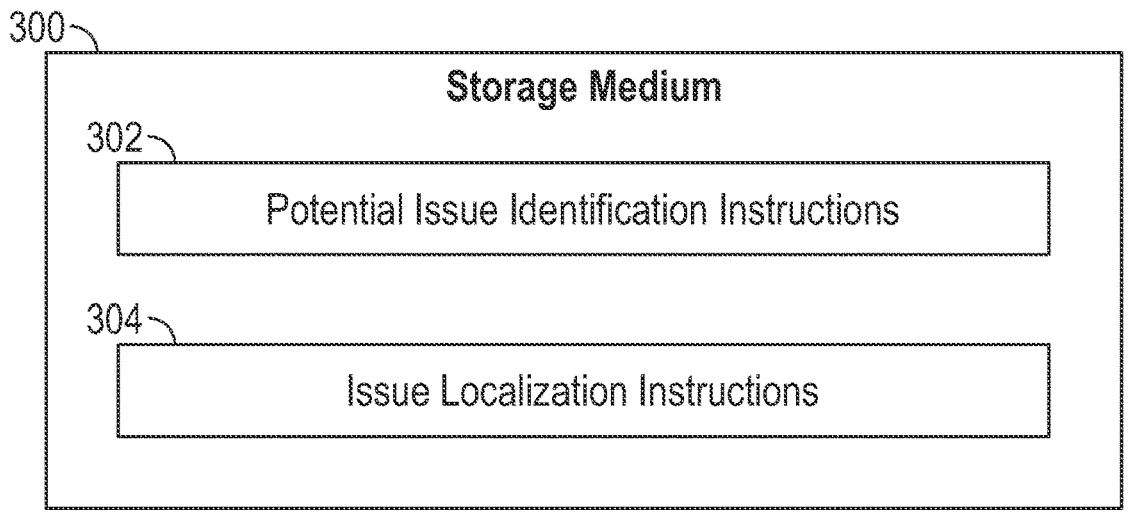
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include potential issue identification instructions 302 to identify a potential issue based on comparing measurement data acquired at different hierarchical levels of a computing environment. For example, the potential issue identification instructions 302 can be part of the vertical assessment logic 128 of FIG. 1.

The machine-readable instructions further include issue localization instructions 304 to, within a hierarchical level of the different hierarchical levels, determine, based on measurement data acquired for objects in the hierarchical level, whether the potential issue is localized to a subset of the objects. The issue localization instructions 304 can be part of the horizontal assessment logic 130 of FIG. 1, for example.

Figure 4:
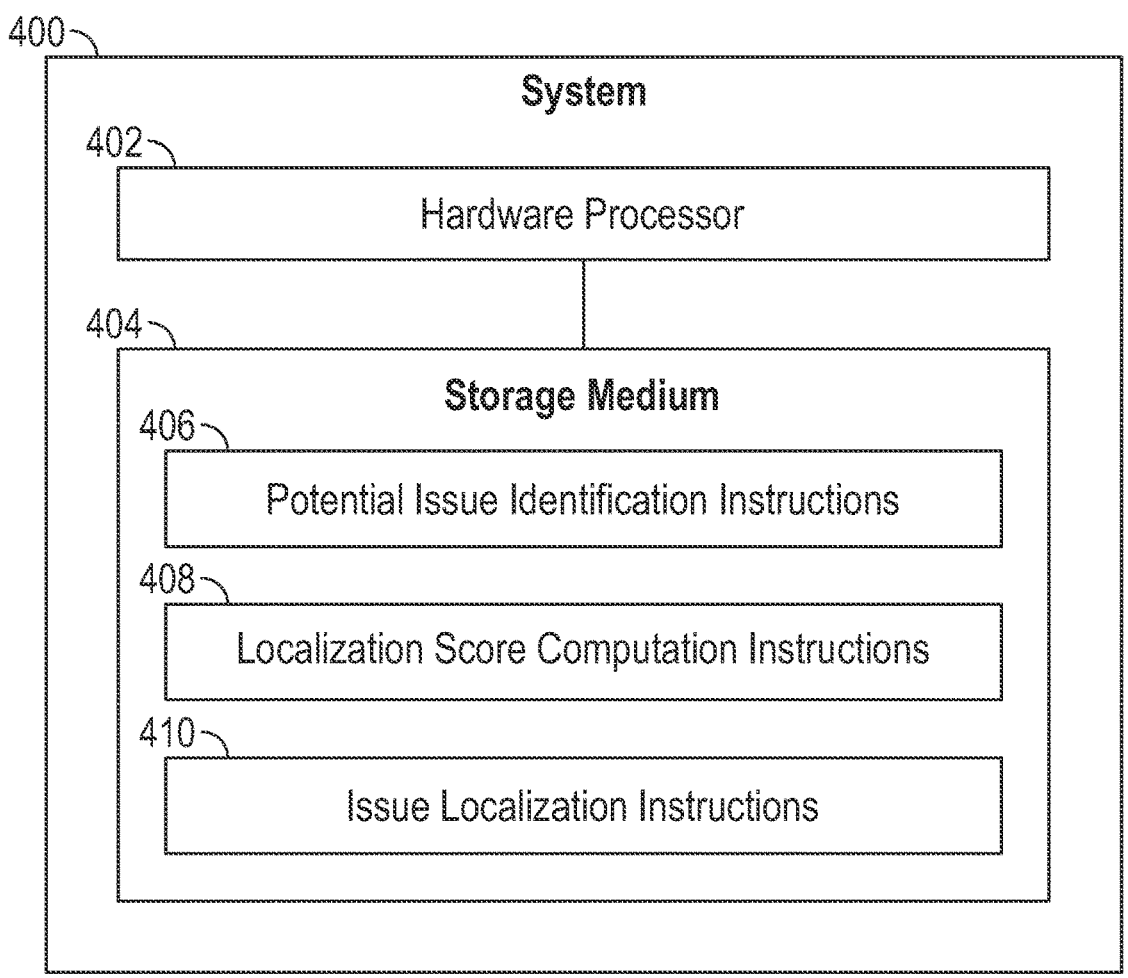
FIG. 4 is a block diagram of a system according to some examples.

FIG. 4 is a block diagram of a system 400 according to some examples. The system 400 can be implemented using a computer or multiple computers.

The system 400 includes a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include potential issue identification instructions 406 to identify a potential issue based on comparing measurement data acquired at different hierarchical levels of a computing environment. For example, the potential issue identification instructions 406 can be part of the vertical assessment logic 128 of FIG. 1.

The machine-readable instructions further include localization score computation instructions 408 to compute localization scores for objects within a hierarchical level of the different hierarchical levels, the localization scores computed based on measurement data acquired for objects in the hierarchical level, and the localization scores indicating a degree of association between the objects within the hierarchical level and the potential issue.

The machine-readable instructions further include issue localization instructions 410 to, based on the localization scores, determine whether the potential issue is localized to a subset of the objects. For example, the localization score computation instructions 408 and the issue localization instructions 410 can be part of the horizontal assessment logic 130 of FIG. 1.

Figure 5:
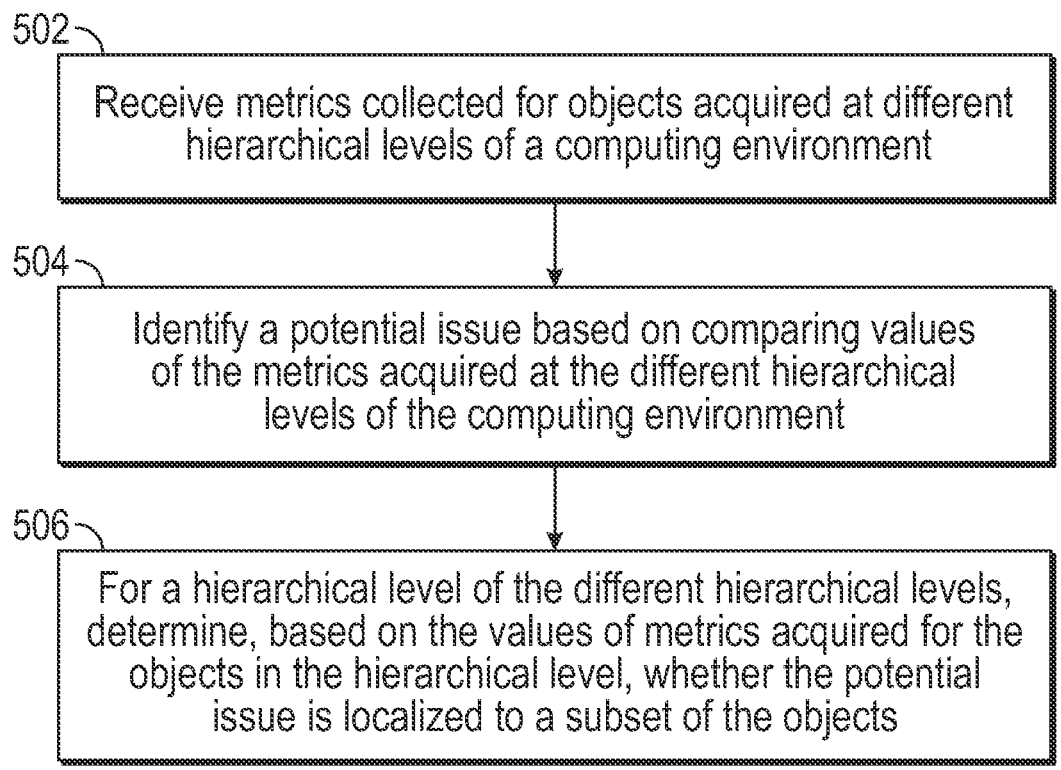
FIG. 5 is a flow diagram of a process according to further examples.

FIG. 5 is a flow diagram of a process according to some examples. The process of FIG. 5 includes receiving (at 502) metrics collected for objects acquired at different hierarchical levels of a computing environment. The metrics may be collected by the sensors 120 and/or monitoring agents 122 of FIG. 1.

The process further includes identifying (at 504) a potential issue based on comparing values of the metrics acquired at the different hierarchical levels of the computing environment. The identifying can be performed by the vertical assessment logic 128 of FIG. 1, for example.

The process further includes for a hierarchical level of the different hierarchical levels, determining (at 506), based on the values of the metrics acquired for the objects in the hierarchical level, whether the potential issue is localized to a subset of the objects.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to: compare measurement data acquired at different hierarchical levels of a computing environment, wherein the different hierarchical levels include a physical machine level, a virtual level comprising different types of virtual resources, and a program level comprising a program to execute on one or more hosts of the physical machine level; based on comparing the measurement data acquired at the different hierarchical levels, identify a potential issue and identify the virtual level of the different hierarchical levels as a potential cause of the potential issue; and in response to identifying the virtual level as the potential cause of the potential issue: compute respective localization scores for the different types of virtual resources determi ne that a first localization score for a first type of virtual resources of the virtual level satisfies a criterion, and determine that a second localization score for a second type of virtual resources of the virtual level does not satisfy the criterion, based on the determination, determine that the potential issue is localized to the first type of the different types of virtual resources of the virtual level, and based on determining that the potential issue is localized to the first type of virtual resources, identify the first type of virtual resources of the virtual level as the cause of the potential issue.

2. The non-transitory machine-readable storage medium of claim 1, wherein the different hierarchical levels further include a storage level.

3. The non-transitory machine-readable storage medium of claim 1, wherein the different types of virtual resources comprise two or more of virtual machines, containers, or virtual storage volumes.

4. The non-transitory machine-readable storage medium of claim 1, wherein virtual wherein the instructions upon execution cause the system to:
determine that a third localization score computed for a third type of virtual resources satisfies the criterion; and
rank the first type of virtual resources and the third type of virtual resources according to the first and third localization scores, wherein the determining that the potential issue is localized to the first type of virtual resources is based on the ranking.

5. The non-transitory machine-readable storage medium of claim 1, wherein the first localization score is based on first measurement data acquired for the first type of virtual resource s, and the second localization score is based on second
measurement data acquired for the second type of virtual resources.

6. The non-transitory machine-readable storage medium of claim 1, wherein the instructions upon execution cause the system to:
trigger a remediation action to address the potential is sue responsive to the identifying of the first type of virtual resources of the virtual level as the cause of the potential issue.

7. The non-transitory machine-readable storage medium of claim 1, wherein the measurement data comprises one or more of: latency metrics representing latency experienced by objects in each hierarchical level of the different hierarchical levels, or performance metrics representing performance of objects in each hierarchical level of the different hierarchical levels.

8. A system comprising: a processor; and a non-transitory storage medium storing machine-readable instructions executable on the processor to: compare measurement data acquired at different hierarchical levels of a computing environment, wherein the different hierarchical levels include a physical machine level, a virtual level comprising different types of virtual resources, and a program level comprising a program to execute on one or more hosts of the physical machine level; identify a potential issue and identify the virtual level of the different hierarchical levels as a potential cause of the potential issue; in response to identifying the virtual level as the potential cause of the potential issue: compute respective localization scores for the different types of virtual resources determine that a first localization score for a first type of virtual resources of the virtual level satisfies a criterion, and determine that a second localization score for a second type of virtual resources of the virtual level does not satisfy the criterion, based on the determination, determine that the potential issue is localized to the first type of the different types of virtual resources of the virtual level, and based on determining that the potential issue is localized to the first type of virtual resources, identify the first type of virtual resources of the virtual level as the cause of the potential issue.

9. The system of claim 8,
wherein that wherein the machine-readable instructions are executable on the processor to:
determine that a third localization score computed for a third type of virtual resources satisfies the criterion; and
rank the first type of virtual resources and the third type of virtual resources according to the first and third localization scores, wherein the determining that the potential issue is localized to the first type of virtual resources is based on the ranking.

10. The system of claim 8, wherein the first localization score is based on first measurement data acquired for the first type of virtual resource s, and the second localization score is based on second measurement data acquired for the second type of virtual resources.

11. The system of claim 8, wherein the machine-readable instructions are executable on the processor to:
trigger a remediation action to address the potential issue responsive to identifying the first type of virtual resources of the virtual level as the cause of the potential issue.

12. The system of claim 8, wherein the different types of virtual resources comprise two or more of virtual machines, containers, or virtual storage volumes.

13. The system of claim 8, wherein the different hierarchical levels further include a storage level.

14. A method performed by a system comprising a hardware processor, comprising: receiving metrics collected for objects acquired at different hierarchical levels of a computing environment, wherein the different hierarchical levels include a physical machine level, a virtual level comprising different types of virtual resources, and a program level comprising a program to execute on one or more hosts of the physical machine level; based on comparing values of the metrics acquired at the different hierarchical levels of the computing environment: identifying a potential issue, and identifying the virtual level of the different hierarchical levels as a potential cause of the potential issue; and in response to identifying the virtual level as the potential cause of the
potential issue: computing respective localization scores for the different types of virtual resources deter mining that values a first localization score for a first type of virtual resources of the virtual level satisfies a criterion, and determining that
values a second localization score for a second type of virtual resources of the virtual level does not satisfy the criterion, based on the determination, determining that the potential issue is localized to the first type of the different types of virtual resources of the virtual level, and based on determining that the potential issue is localized to the first type of virtual resources, identifying the first type of virtual resources of the virtual level as the cause of the potential issue.

15. The method of claim 14, wherein the different types of virtual resources comprise two or more of virtual machines, containers, or virtual storage volumes.

16. The method of claim 14, further comprising:
in response to determining that the potential issue is localized to the first type of virtual resources, triggering a remediation action to address the potential issue.

17. The method of claim 14,
wherein the first localization score is computed based on values of first metrics collected for the first type of virtual resources and the second localization score is computed based on values of second metrics collected for the second type of virtual resources,
wherein virtual.

18. The method of claim 14, comprising:
determining that a third localization score computed for a third type of virtual resources satisfies the criterion; and
ranking the first type of virtual resources and the third type of virtual resources according to the first localization score and the third localization score, wherein the determining that the potential issue is localized to the first type of virtual resources is based on the ranking.

\* \* \* \* \*